(12) United States Patent
Ritter et al.

(10) Patent No.: US 8,114,796 B2
(45) Date of Patent: Feb. 14, 2012

(54) FLUORINE-FREE OPTICAL GLASS

(75) Inventors: Simone Monika Ritter, Mainz (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 945 days.

(21) Appl. No.: 11/866,210

(22) Filed: Oct. 2, 2007

(65) Prior Publication Data

US 2008/0085826 A1 Apr. 10, 2008

(30) Foreign Application Priority Data

Oct. 6, 2006 (DE) .......... 10 2006 047 783

(51) Int. Cl.
| C03C 3/19 | (2006.01) |
| C03C 3/16 | (2006.01) |
| C03C 3/21 | (2006.01) |
| C03C 3/17 | (2006.01) |
| C03C 3/14 | (2006.01) |
| C03C 3/15 | (2006.01) |
| C03C 3/155 | (2006.01) |
| C03C 3/145 | (2006.01) |

(52) U.S. Cl. .............. 501/47; 501/45; 501/46; 501/48; 501/50; 501/51; 501/52

(58) Field of Classification Search .......... 501/45–52
See application file for complete search history.

(56) References Cited

U.S. PATENT DOCUMENTS

| 3,216,836 A | 11/1965 | Jahn |
| 3,278,318 A | 10/1966 | Hensler et al. |
| 4,771,020 A | 9/1988 | Omata et al. |
| 6,127,297 A | 10/2000 | Hashimoto |
| 6,156,684 A | 12/2000 | Sato et al. |
| 6,333,282 B1 | 12/2001 | Nakahata et al. |
| 2004/0259714 A1 | 12/2004 | Fujiwara et al. |
| 2005/0054511 A1 | 3/2005 | Fujiwara et al. |
| 2005/0113239 A1 | 5/2005 | Miyata et al. |
| 2006/0150682 A1 | 7/2006 | Fujiwara et al. |

FOREIGN PATENT DOCUMENTS

| DE | 1 023 861 | 2/1958 |
| DE | 1 089 934 | 9/1960 |
| DE | 45 628 | 6/1966 |
| DE | 1 421 879 | 11/1968 |
| DE | 1 596 854 | 3/1971 |
| DE | 198 26 637 | 12/1998 |
| GB | 972350 | 10/1964 |
| JP | 61-40839 | 2/1986 |
| JP | 08104537 | 4/1996 |
| JP | 11064036 | 3/1999 |
| JP | 11199269 | 7/1999 |
| JP | 2001-64036 | 3/2001 |
| JP | 2001058845 | 3/2001 |
| JP | 2003300751 | 10/2003 |
| JP | 2006-052119 | 2/2006 |

*Primary Examiner* — Melvin Mayes
*Assistant Examiner* — Kevin Johnson
(74) *Attorney, Agent, or Firm* — Michael J. Striker

(57) ABSTRACT

The lead-free and fluorine-free optical glass has a refractive index of $1.60 \leq n_d \leq 1.64$ and an Abbe number of from $56 \leq v_d \leq 64$, a transformation temperature less than or equal to 590° C., can be precise pressed and is stable to cystallization. The glass has the following, composition (in weight-% based on oxide content. $P_2O_5$, 26-35; $B_2O_3$, 10-15; $Al_2O_3$, 5.5-10; BaO, 25-37; SrO, 0-6; CaO, 8-15; ZnO, 3-10; $Bi_2O_3$, 0-8; $Na_2O$, 0-2; $K_2O$, 0-2; $WO_3$, 0-10; $La_2O_3$, 0-2; $Nb_2O_5$, 0-1; $TiO_2$, 0-<1; Σ alkaline earth metal oxides ≧40; Σ alkali metal oxides, 0-2 and at least one fining agent, 0-0.5.

8 Claims, 1 Drawing Sheet

FLUORINE-FREE OPTICAL GLASS

CROSS-REFERENCE

Figure 1:
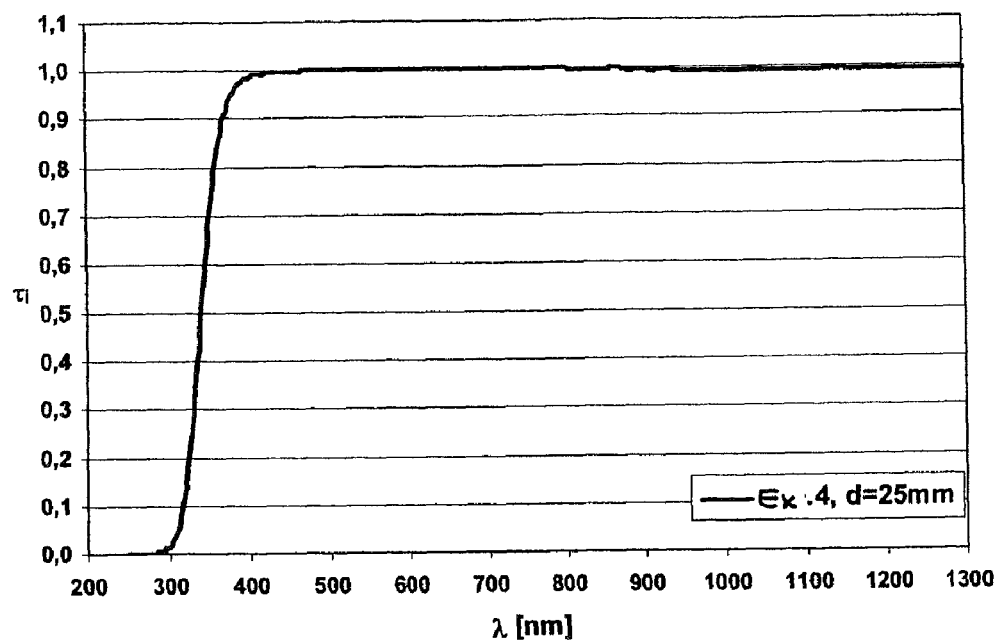

The subject matter described and claimed herein below is also described in German Patent Application No. 10 2006 047 783.9, filed on Oct. 6, 2006 in Germany. This German Patent Application provides the basis for a claim of priority of invention for the invention described and claimed herein below under 35 U.S.C. 119 (a)-(d).

BACKGROUND OF THE INVENTION

1. The Field of the Invention

The present invention refers to a fluorine- and lead-free and preferably arsenic-free optical phosphate glass, the use of such a glass in the areas of imaging, projection, telecommunication, optical telecommunication engineering, mobile drive and laser technology as well as optical components or pre-forms of such optical components.

2. The Description of the Related Art

In recent years the trend of the market in optical as well as opto-electronical technologies (areas of application imaging, projection, telecommunication, optical telecommunication engineering, mobile drive and laser technology) increasingly goes in the direction of miniaturization. This can be seen from the increasingly smaller end products and requires cumulative miniaturization of single parts and components of such end products. For manufacturers of optical glasses this development is connected to an articulately decreasing volume of demanded raw glass despite higher numbers of end products. At the same time, increasing pressure of prices towards the glass manufacturers arises on the part of subsequent processing industry, because there is far more waste in relation to the product when manufacturing smaller components from block or ingot glass and the processing of such small parts is requiring much more effort than with bigger components.

Thus, instead of detaching glass portions for optical components from block or ingot glass as it was usual up to now, recently processing techniques gain importance that, directly after the glass melt, provide for near-net-shape pre-forms like for example gobs or spheres. For example the demand of the subsequent processing industry for near-net-shape pre-forms for re-pressing, so called "precision gobs". "Precision gobs" are preferably understood as completely fire-glazed, semi-free or free formed glass portions that are already portioned and of a geometry that is near the final geometry of the optical component.

Such precision gobs can advantageously be converted into optical elements like lenses, aspheres etc. by so called precise pressing or precision moulding. A further processing of the geometrical form or of the surface by for example surface polishing is not necessary anymore. Using this method allows to flexibly provide the required small glass melt volumes (distributed into large numbers of small pieces of material) with small changeover times. Because of the relatively low number of cycles and pieces and usually small geometries, the added value of the method cannot be derived from the value of the material alone. Hence, the products must leave the press in a state that is ready to system installation, i.e. one must be able to abstain from time-consuming finishing, cooling and/or cold post-processing steps. For such pressing methods precise instruments with high-value and, hence, expensive form materials must be used, because of the required high geometrical precision. The cost-effectiveness of the produced products and/or materials is thus strongly influenced by stand-still periods of the forms. A very important factor of high stand-still periods is a preferably low operating temperature which can however only be lowered as long as the viscosity of the materials to be formed is sufficient for the pressing process. There is, hence, a causal relationship between the processing temperature and thereby the glass transition temperature Tg of a glass to be processed and the cost-effectiveness of such a moulding process: the lower the glass transition temperature of a glass, the higher are the stand-still periods of the forms and the higher is the profit margin. From this context it can be derived that there is a need for so-called "low-Tg glasses", that means glasses with low melt and transition points, i.e. glasses that show a viscosity that is suitable for processing at preferably low temperatures.

In the process engineering of the melt there has newly been an increasing demand for "short" glasses, i.e. glasses strongly changing viscosity—in a certain viscosity range—with a relatively small variation of temperature. This behaviour bears the advantage during the melting process that the hot-pressing times, i.e. the tight-fit times can be decreased. With this improvement the throughput is increased, i.e. the clock cycle is reduced, on the one hand. And on the other hand the mould material is preserved which—as described above—has positive effects on the overall production costs. Such "short" glasses have as a further advantage that with quicker cooling down than "longer" glasses, also glasses with higher crystallisation tendencies may be processed. A preformation of seed crystals that could pose problems in secondary moulding processes is avoided. This offers the possibility to draw fibres from such glasses.

Furthermore it is desirable that the glasses, next to the above-mentioned properties and the necessary optical properties, are sufficiently chemically resistant and have preferably small extension coefficients.

In the state of the art glasses with similar optical positions or comparable chemical compositions are described, but these glasses suffer from considerable drawbacks. Especially, many of these glasses contain higher amounts of fluorine and/or $Li_2O$ that evaporate very easily during melting processes which renders a precise adjustment of the glass composition difficult. This evaporation also has negative effects on the pressing process wherein the glass is heated up again and could deposit on the surface of the moulds and form precipitations on the glass. Furthermore many glasses contain $SiO_2$ that as a network former—increases the glass transition temperature of the glass and causes a longer viscosity curve.

Higher amounts of the component $Nb_2O_5$ (more than 22% by weight) and of the component $TiO_2$, too, are described in the state of the art as obligatory components. $Nb_2O_5$ as well as $TiO_2$ strongly increase the refractive index ($n_d$) and as strongly decrease the Abbe number ($v_d$). In order to achieve the optical position of $n_d$ 1.60 to 1.64 and $v_d$ of 56 to 64 the content of $Nb_2O_5$ and/or $TiO_2$ should be very small, especially smaller 1% by weight or preferably these components should not be contained in the composition.

JP 2001058845, JP 2003300751 and JP 08104537 describe optical glasses with high refractive indices and high dispersions partly for precision moulding. These glasses imperatively comprise the component $Nb_2O_5$ in very high amounts. Therewith an Abbe number >56 cannot be provided.

US 2005/054511 describes an optical glass for precision moulding that imperatively comprises the colouring component CuO.

DE 1023861 refers to an optical glass comprising alkali earth metals of 10-40% by weight (see claim 1). In order to allow for a high refractive index and a high Abbe number however alkali earth metal contents of more than 40% are needed. Furthermore the glasses according to this document do not comprise aluminium oxide. This component however is obligatory in order to improve the chemical resistance of phosphate glasses. The same applies to the desired steepness of the viscosity curve in the defined range. Finally the environmentally unsafe cadmium oxide as well as in part lead oxide is part of the glasses disclosed in DE 1023861.

DE 1089934 describes an optical crown glass with a refractive index of 1.53 to 1.68 in which the sum of the contained alkali, alkali earth, aluminium, zinc, cadmium, lanthanum, arsenic, antimony, lead and bismuth oxides is not more than 48% by weight. Such glass systems do not provide for a balance between the refractive index on the one hand and the Abbe number on the other hand as achieved by the present invention.

DE 1421879 also describes a crown glass with an $Al_2O_3$ content of less than 5% by weight and/or a content of $La_2O_3$ of more than 2% by weight. A aluminium oxide content of less than 5% by weight causes a bad chemical resistance. The high content of lanthanum oxide leads to an increase of refractive index, however simultaneously leads to a strong decrease of the Abbe number to values below 56. Furthermore the glass transition temperature of the glass is undesirably raised.

JP 2001064036 comprises a phosphate glass as filling material in resins. Glasses with a high $P_2O_5$-content of 40 to 90 mol % are claimed. With such a high content of $P_2O_5$ a refractive index of >1.6 cannot be achieved.

DE 19826637 describes an optical glass with photoelastic coefficients and imperatively contains the toxic component PbO.

JP 61040839 comprises an optical phosphate glass with a refractive index of 1.52 to 1.89 and an Abbe number of 26 to 65. The glass imperatively comprises the component $Sb_2O_3$ in an amount of at least 1% by weight. $Sb_2O_3$ in this case serves as a glass forming agent and may have negative effects on high transmission in these high contents. In the glass according to the present invention $Sb_2O_3$ may be present merely as a fining agent in an amount of up to 0.5% by weight.

The document U.S. Pat. No. 6,127,297 describes optical glasses with a specific density of <3. The essential component is further to $P_2O_5$, $TiO_2$ present in an amount of at least 1.15% by weight, displacing the UV edge of the glass to the longer wavelength region.

U.S. Pat. No. 4,771,020 describes an optical phosphate glass comprising proportions of $Sb_2O_3$, $Bi_2O_3$ and of toxic PbO in a range of from 34 to 74% by weight.

US 2004/0259714 comprises an optical glass for precise pressing with a refractive index of from 1.55 to 1.71 and an Abbe number of from 57 to 70. The glass obligatorily contains $P_2O_5$ in relatively high amounts of from 28 to 50 mol %. Furthermore high contents of alkali oxides are contained, leading to undesirable decrease in refractive index.

JP 11199269 describes an optical BaO containing phosphate glass with a low photoelastic constant and a low amount of $B_2O_3$, namely up to 4% by weight.

In U.S. Pat. No. 3,278,318 a glass is disclosed that comprises very high proportions of $WO_3$ with 15 to 85% by weight, not providing for Abbe numbers of ≦56.

US 2005/0113239 discloses a glass having extraordinarily high contents of $Nb_2O_5$ of 35 to 65% by weight. This does not allow for high Abbe values.

The glasses disclosed in DE 1596854 contain high amounts of $P_2O_5$. and are basically fluorine containing glasses (see claim 2, specifying claim 1, saying that high amounts of fluorides are present). Furthermore the glasses may contain undesired components like lead or thorium.

US 2006/0150682 A1 describes glasses with an Abbe number in a range between 59 to 70, all of which containing the very volatile component $Li_2O$ in an amount of up to 20% by weight.

SUMMARY OF THE INVENTION

It is the problem solved by the present invention, especially motivated by ecological considerations, to provide optical glasses with the desired advantageous optical properties ($v_d$/$n_d$) and, at the same time, low glass transition temperatures without using PbO, $Tl_2O$ and $TeO_2$, CdO, ThO and preferably also without $SiO_2$ and $Li_2O$.

The glasses should furthermore be workable using precise pressing techniques and suitable for the application fields of imaging, projection, telecommunications, optical telecommunication engineering, mobile drive and laser technology, having refractive indices of from $1.60 \leq n_d \leq 1.64$, an Abbe number of from $56 \leq v_d \leq 64$ and preferably a relatively low glass transition temperature $Tg \leq 590°$ C.

Additionally the glasses shall be easy to melt and to process as well as provide sufficient crystallisation stability, allowing for processing in continuously run units. A preferably "short" glass in a viscosity range of from $10^{7.6}$ to $10^{13}$ dPas is desirable. A so called "short" glass in general means a glass having a very steep viscosity curve in the viscosity range from $10^2$ to $10^{13}$ dpas. For the glasses according to the present invention the term "short" is used for a viscosity range from $10^{7.6}$ to $10^{13}$ dPas.

The above-said problem is solved by the embodiments of the present invention as described in the claims.

In particular, a lead and fluorine and preferably also $SiO_2$ and/or $Li_2O$ free optical glass with a refractive index $n_d$ of $1.60 \leq n_d \leq 1.64$ and an Abbe number $v_d$ of $56 \leq V_d \leq 64$ is provided, comprising the following composition (in % by weight based on oxide):

| | |
|---|---|
| $P_2O_5$ | 26-35 |
| $B_2O_3$ | 10-15 |
| $Al_2O_3$ | 5.5-10 |
| BaO | 25-37 |
| SrO | 0-6 |
| CaO | 8-15 |
| ZnO | 3-10 |
| $Bi_2O_3$ | 0-8 |
| $Na_2O$ | 0-2 |
| $K_2O$ | 0-2 |
| $WO_3$ | 0-10 |
| $La_2O_3$ | 0-2 |
| $Nb_2O_5$ | 0-1 |
| $TiO_2$ | 0-<1 |
| Σ alkaline earth metal oxides | ≧40 |
| Σ metal oxides | 0-2 |
| at least one fining agent | 0-0.5. |

The sum of alkaline earth metal oxides is greater than or equal to 40% by weight, more preferably greater than or equal to 41% by weight.

Preferably, the sum of alkali metal oxides is in the range from 0 to 2% by weight. Preferably, the glasses are free of components that are not mentioned, in particular free of components not being ecologically tolerable like cadmium and lead. Furthermore the glasses are preferably free of radioactive components like for example thorium.

The glasses according to the present invention and optical glasses of similar glass families known in the art have in common the optical position, like Abbe number and refractive index. They are however distinguished by a good meltability and workability as well as a good ecological tolerability.

In particular these glasses are adequate for near-net-shape processing like for example the manufacture of precision gobs as well as precise pressing processes for the production of optical components with exact net-shape. In this context the viscosity temperature profile and the processing temperature of the glasses according to the present invention have preferably been adjusted in such a way that such a near-net-shape or net-shaping precision moulding process is possible even with precision instruments.

Additionally the combination of crystallisation stability and viscosity temperature profile of the glasses according to the present invention allows for unproblematic (subsequent) processing (pressing or re-pressing) of the glasses.

In particular, the glasses according to the present invention show a refractive index $n_d$ from $1.60 \leq n_d \leq 1.64$, preferably from $1.61 \leq n_d \leq 1.63$ and an Abbe number $v_d$ of from $56 \leq v_d \leq 64$, preferably from $57 \leq v_d \leq 64$ and most preferably from $59 \leq v_d \leq 64$.

According to an embodiment of the present invention, the glasses according to the present invention show a glass transition temperature of $Tg \leq 590°$ C., more preferably $Tg \leq 585°$ C. and most preferably $Tg \leq 570°$ C.

According to the present invention a so called "low-Tg-glass" is a glass with a low glass transition temperature Tg, i.e. preferably a glass with a Tg of up to 590° C.

The glasses according to the present invention are preferably "short" in a viscosity range from $10^{7.6}$ to $10^{13}$ dPas. "Short glasses" in this context are glasses that undergo a strong variation of viscosity with a relatively low variation of temperature within a certain viscosity range. Preferably the temperature variation $\Delta T$ in which the viscosity of the glass decreases from $10^{7.6}$ to $10^{13}$ dPas is up to 110K, preferably up to 100K, mostly.

The term "inner quality" of the glass means according to the present invention the fact that the glass shows only a small number of bubbles and/or striae and/or other faults or that the glass is free thereof.

In the following the expression "X-free" or "free of a component X" means that the glass is essentially not containing the component X, i.e. this component is—if at all—present in the glass as impurity, however has not been added to the glass composition as a particular component. X in this context can be any component, like for example, fluorine.

Any specification of proportions of the glass components below are by weight percent based on oxides as far as nothing else is declared.

The basic glass system of the glass according to the present invention is barium containing phosphate system that is a good basis for the desired properties.

The glass according to the present invention comprises a $P_2O_5$-content of at least 26% by weight, preferably at least 27% by weight, preferably at least 28% by weight. The content of $P_2O_5$ is limited to up to 35% by weight, preferably up to 34% by weight, particularly preferably 33% by weight. The said lower limit of 26% by weight shall not be undergone, because otherwise the viscosity/glass transition temperature of the glass is increased too much. The maximum content shall not exceed 35% by weight in order to provide for the desired refractive index and Abbe value in the glass system.

The glass according to the present invention comprises at least 25% by weight, preferably at least 27% by weight, particularly preferably at least 28% by weight, most preferably at least 29% by weight BaO. The glass according to the present invention comprises up to 37% by weight, preferably up to 35% by weight, particularly preferably up to 34% by weight, most preferably up to 33% by weight BaO. BaO, together with CaO and if applicable SrO, contributes in a decisive extent to the achievement of a refractive index >1.6 in combination with the high Abbe number of 56. Furthermore the desired viscosity temperature behaviour ("short" glass) can be adjusted in a viscosity range from $10^{7.6}$ to $10^{13}$ dpas.

Based on the same causes, the glass according to the present invention comprises at least 8% by weight, particularly preferably 9% by weight, most preferably 10% by weight of calcium oxide. The glass according to the present invention comprises up to 15% by weight, preferably up to 14% by weight, particularly preferably 13% by weight, most preferably less than 12% by weight of calcium oxide.

SrO can be incorporated into the glass according to the present invention in a proportion of up to 6% by weight, preferably 5% by weight. The maximum content shall not exceed 6% by weight, in order to provide for a low Tg.

The sum of the alkaline earth metal oxides is greater than or equal to 40% by weight, preferably greater than or equal to 41% by weight. The alkaline earth metal oxides metals provide for a steep viscosity curve and a high Abbe number.

The glass according to the present invention comprises a ZnO-content of at least 3% by weight, preferably at least 4% by weight, particularly preferably at least 5% by weight. Together with the $B_2O_3$ it provides for a well melting glass with low glass transition temperature ("low-Tg-glass"). The ZnO content is up to 10% by weight, preferably up to 9% by weight, particularly preferably 8% by weight. ZnO contributes to the desired viscosity temperature behaviour ("short" glass) in the viscosity range from $10^{7.6}$ to $10^{13}$ dPas. The maximum amount of 10% by weight shall not be exceeded, because ZnO tends to evaporate.

The glass according to the present invention comprises a $B_2O_3$-content of at least 10% by weight, preferably at least 11% by weight, particularly preferably 11.5% by weight. The maximum content of $B_2O_3$ is 15% by weight, preferably up to 14% by weight, more preferably up to 13% by weight. $B_2O_3$, together with ZnO, provides for a well melting glass. The content shall not exceed 15% by weight, because otherwise the glasses will get "longer", which is not desired according to the present invention. Furthermore, parts of the added $B_2O_3$ may evaporate during the melting process making it difficult, to adjust a precise composition.

The glass according to the present invention comprises an $Al_2O_3$-content of at least 5.5% by weight. The content of $Al_2O_3$ is limited to 10% by weight, preferably 9% by weight, particularly preferably 8% by weight. The said upper limit of 10% by weight shall not be exceeded, as the viscosity would increase too much because of the network-building properties of $Al_2O_3$ and, hence, would no longer fulfil the criteria of "low-Tg-glasses". A minimum amount of 5.5% by weight should however not be undergone, as the chemical resistance (acid resistance) of the phosphate glass could suffer.

Preferably only $Na_2O$ and/or $K_2O$ are added as alkali metal oxides $M_2O$ to the glass according to the present invention. $Li_2O$ as a far more easily evaporating oxide is not preferred. The glass according to the present invention is free of $Li_2O$ in preferred embodiments of the present invention.

Into the glass according to the present invention $Na_2O$ and/or $K_2O$ can be incorporated in an amount of up to 2% by weight, in order to keep the Tg low.

The sum of the alkali metal oxides in the glass according to the present invention is 0 to 2% by weight, preferably up to 1.5% by weight. The sum of the alkali metal oxides counts up to 2% by weight, which value shall not be exceeded, because otherwise the refractive index of such a glass system would decrease too much. The addition of the alkali metal oxides optimizes the melting properties, i.e. the oxides serve as flux melting agent. Furthermore they contribute to a decrease of Tg.

The glass according to the present invention may comprise a $Bi_2O_3$-content of up to 8% by weight, preferably up to 7% by weight, particularly preferably up to 6% by weight, more preferred up to 5%, 4% or 3% by weight. $Bi_2O_3$ supports the desired viscosity temperature behaviour ("short" glass) in the viscosity range of from $10^{7.6}$ to $10^{13}$ dPas. Furthermore the component decreases the Tg and increases the density of the glass. The latter provides for a high refractive index. The maximum amount of 8% by weight should not be exceeded, because $Bi_2O_3$ introduces colour into the glass and, hence, the transmission of the glass would become bad. Besides a too high content of $Bi_2O_3$ leads to an undesired decrease of the Abbe number.

The glass according to the present invention may, due to the production process, comprise silicon dioxide in amounts of up to 3% by weight, preferably 2% by weight. More suitable are glasses with a $SiO_2$-content of 1% by weight and preferred are glasses free of $SiO_2$. $SiO_2$ leads to higher glass transition temperatures and higher viscosities of the glasses.

The glass is preferably free of $TiO_2$. It may comprise 0 to less than 1% by weight $TiO_2$. $TiO_2$ provides for a high refractive index and a high dispersion and may serve for adjustment of the optical position. Preferred are contents of below 0.5% by weight, more preferred below 0.3% by weight and particularly preferred below 0.1% by weight. However the component leads to higher glass transition temperatures and viscosities of the glasses and furthermore negatively influences the transmission by absorption in the ultraviolet region. 1% by weight of $TiO_2$ should not be exceeded, because the component may unwantedly serve as a nucleating agent and, hence, support devitrification. Thus, the glass according to the present invention is preferably free of $TiO_2$.

The glass may comprise up to 10% by weight of $WO_3$. A higher content has negative effects on the Abbe number of the glass. Preferably this component is present in amounts of up to 5% by weight, more preferably of up to 3% by weight, and particularly preferably up to 1% by weight. Ideally, the glass is free of $WO_3$.

Furthermore, the glass may comprise up to 2% by weight of $La_2O_3$, preferably up to 1% by weight. Particularly preferably, the glass is free of $La_2O_3$.

With a high content of $Nb_2O_3$ Abbe numbers in the range according to the present, invention cannot be achieved. Thus, the content of $Nb_2O_3$ is limited to 1% by weight, preferably to 0.5% by weight. Particularly preferably the glass is free of this component.

Preferably, the glass is free of colouring CuO, too.

The glass according to the present invention as an optical glass is also free of other colouring and/or optically active, like laser-active, components.

Especially, the glass is also free of components, being redox-sensitive, like for example Ag and/or free of toxic or health impairing components like for example the oxides of Tl, Te, Be, Cd, Th and so on. In any case is the glass free of PbO.

According to an embodiment of the present invention the glass is preferably also free of components not mentioned in the claims, i.e. according to such embodiments, the glass essentially consists of the given components. The term "essentially consist of" in this context means that other components are only present as impurities, but were not intentionally added to the composition as a component as such.

The glass according to the present invention may comprise common fining agents in small amounts. Preferably, the sum of the fining agents used does not exceed 0.5% by weight, more preferably 0.3% by weight. As fining agent at least one of the following components may be present (in % by weight in addition to the rest of the glass composition):

| | |
|---|---|
| $Sb_2O_3$ | 0-0.5 and/or |
| $As_2O_3$ | 0-0.5 and/or |
| SnO | 0-0.5 and/or |
| $SO_4^{2-}$ | 0-0.5 |

Fluorine and fluorine-containing compounds serve as fining agents but tend to evaporate during the melting process as well as during precise pressing. Therewith a precise adjustment of the glass composition is impeded. Hence, the glass according to the present invention is free of fluorine.

As far as the said preferred ranges of components are concerned, the skilled person will, departing from the ranges for example given in claim 1, chose a preferred range for each component.

According to the present invention, the phosphate is preferably added to the batch as a complex phosphate. It is also based on this cause that a content of up to 35% by weight of phosphate oxide is preferred, because at higher amounts the proportion of "complex phosphates" decreases in favour of "free" $P_2O_5$ leading to unmanageable melting properties and significantly increased evaporation and dusting effects accompanied by an impaired inner quality, Additionally, a higher amount of free, i.e. non-complex phosphate demands more severe security requirements in the production plant increasing production costs. The term "complex phosphate" according to the present invention means that no phosphate is added in the form of $P_2O_5$, but components like MO and $M_2O$ are not added to the batch as oxides or carbonates but as phosphates like for example in the form of barium hydrogen phosphate and/or -metaphosphate and alkali hydrogen phosphate and/or—metaphosphate. Therewith the processability of the glass is ameliorated significantly. The dusting tendency of the batch is can drastically be lowered because complex phosphate in contrast to free phosphates can be moistened. Furthermore, the evaporation-tendency of the glass melt decreases. Thus, significantly ameliorated homogeneities of the glass melt are achieved which effect is particularly reflected in quality and homogeneity of the optical data of the generated glass.

The present invention furthermore refers to the use of the glasses according to the present invention in the areas of application imaging, projection, telecommunication, optical telecommunication engineering, mobile drive and laser technology.

Additionally, the present invention refers to optical elements that comprise the glass according to the present invention. Optical elements in this context can particularly be lenses, aspheres, prisms and compact parts. The term "optical element" in this context according to the present invention comprises pre-forms of such an optical element like for example gobs, precision gobs and similar products.

The present invention is illustrated in the following by a set of examples, but is not limited to said examples.

EXAMPLES

The following examples show preferred glasses according to the invention and shall not limit the scope of protection.

Example 1

The raw material is weighed, one or more fining agents like for example $Sb_2O_3$ are added and the batch is blended subsequently. The batch is molten at 1170° C. in a continuous melting unit, afterwards it is fined (1170° C.) and homogenized. At a casting temperature of 1070° C. the glass can be cast and processed to the desired proportions. In a continuous unit of big volume the temperatures may according to experience be lowered by at least 100 K and the material can be processed in a near-net-shape process.

TABLE 1 melt example for 100 kg calculated glass (according to example glass 3):

| Oxide | % by weight | raw material | weight-in quantity (g) |
|---|---|---|---|
| $P_2O_5$ | 31.21 | $P_2O_5$, $Ba(H_2PO_4)_2$ | 423.88 see below |
| $B_2O_3$ | 12.71 | $H_3BO_3$ | 22584.99 |
| $Al_2O_3$ | 5.73 | $Al(OH)_3$ | 8889.06 |
| BaO | 32.15 | $Ba(H_2PO_4)_2$ | 71755.35 |
| CaO | 11.44 | $CaCO_3$ | 20281.41 |
| ZnO | 5.61 | ZnO | 5614.98 |
| $Na_2O$ | 1.14 | $NaHCO_3$ | 3089.08 |
| $Sb_2O_3$ | 0.02 | $Sb_2O_3$ | 20.07 |
| sum | 100.01 | | 132658.82 |

Table 2 contains examples for glasses 1 to 9 according to the present invention.

TABLE 2 examples 1 to 9 (specifications in % by weight based on oxides)

| | Example | | | | | | | | |
|---|---|---|---|---|---|---|---|---|---|
| | 1 | 2 | 3 | 4 | 5 | 6 | 7 | 8 | 9 |
| $P_2O_5$ | 29.48 | 30.59 | 31.21 | 31.21 | 30.40 | 31.23 | 31.57 | 28.14 | 27.56 |
| $Bi_2O_3$ | 5.94 | 1.75 | | | | | | | |
| $B_2O_3$ | 11.62 | 12.46 | 12.71 | 12.71 | 12.49 | 12.72 | 12.86 | 15.13 | 12.98 |
| $Al_2O_3$ | 6.34 | 6.58 | 5.73 | 5.54 | 5.63 | 5.54 | 5.60 | 5.72 | 8.48 |
| $Na_2O$ | 0.00 | 0.29 | 1.14 | 1.74 | 1.71 | 1.74 | 1.76 | 1.79 | 1.17 |
| BaO | 30.36 | 31.52 | 32.15 | 32.16 | 34.48 | 29.23 | 29.55 | 30.17 | 32.53 |
| SrO | | | | | | 3.98 | | | |
| CaO | 10.80 | 11.21 | 11.44 | 11.01 | 9.76 | 9.94 | 10.59 | 10.81 | 11.57 |
| ZnO | 5.30 | 5.50 | 5.61 | 5.61 | 5.51 | 5.61 | 8.04 | 8.21 | 5.67 |
| $Sb_2O_3$ | | | 0.02 | 0.02 | 0.03 | 0.03 | 0.03 | 0.03 | 0.03 |
| $As_2O_3$ | 0.15 | 0.10 | | | | | | | |
| Σ | 100 | 100 | 100 | 100 | 100 | 100 | 100 | 100 | 100 |
| Σ RO (R = Ba, Ca, Sr) | 41.16 | 42.73 | 43.59 | 43.17 | 44.24 | 43.15 | 40.14 | 40.98 | 44.10 |
| Σ RO (R = Ba, Ca, Sr, Zn) | 46.46 | 48.23 | 49.20 | 48.78 | 49.75 | 48.76 | 48.18 | 49.19 | 49.77 |
| properties | | | | | | | | | |
| τi (25 mm, 360 nm) | 0.629 | 0.723 | 0.806 | 0.817 | 0.755 | 0.741 | 0.759 | 0.757 | 0.701 |
| τi (25 mm, 400 nm) | 0.927 | 0.963 | 0.981 | 0.986 | 0.977 | 0.970 | 0.975 | 0.964 | 0.961 |
| τi (25 mm, 420 nm) | 0.948 | 0.978 | 0.990 | 0.994 | 0.988 | 0.980 | 0.986 | 0.975 | 0.978 |
| τi (25 mm, 440 nm) | 0.956 | 0.982 | 0.991 | 0.996 | 0.991 | 0.982 | 0.988 | 0.978 | 0.982 |
| $n_d$ (7 K/h) | 1.63063 | 1.61704 | 1.61210 | 1.6104 | 1.61179 | 1.60889 | 1.60841 | 1.60932 | 1.61213 |
| $v_d$ (7 K/h) | 56.31 | 60.72 | 62.69 | 62.67 | 62.49 | 62.82 | 62.56 | 61.59 | 61.30 |
| $P_{g,F}$ | 0.5519 | 0.5447 | 0.5416 | 0.5422 | 0.5419 | 0.5413 | 0.5416 | 0.5426 | 0.5428 |
| $\Delta P_{g,F}$ | 0.0028 | 0.0030 | 0.0032 | 0.0038 | 0.0032 | 0.0031 | 0.0030 | 0.0024 | 0.0021 |
| $\alpha_{(20-300° C.)}$ $[10^{-6}/K]$ | 10.01 | 10.03 | 10.29 | 10.46 | 10.57 | 10.48 | 10.12 | 10.15 | 10.22 |
| Tg [° C.] | 581 | 576 | 565 | 549 | 554 | 554 | 544 | 542 | 554 |
| r [g/cm$^3$] | 3.575 | 3.491 | 3.467 | 3.449 | 3.497 | 3.444 | 3.430 | 3.423 | 3.438 |
| T bei $10^{7,6}$ dPas [° C.] | 672 | 670 | 665 | 653 | 653 | 656 | 642 | 646 | 662 |
| ΔT [T($10^{13}$ dPas) − T($10^{7,6}$ dPas)] | 88 | 90 | 96 | 100 | 95 | 98 | 94 | 100 | 104 |

The glasses according to the present invention of examples 1 to 9 show a glass, transition temperature Tg of less or equal to 581° C. (at a metering precision of ±5° C.) and are well workable.

FIG. 1 shows a internal transmittance curve of a glass according to the present invention of example 4.

Figure 2:
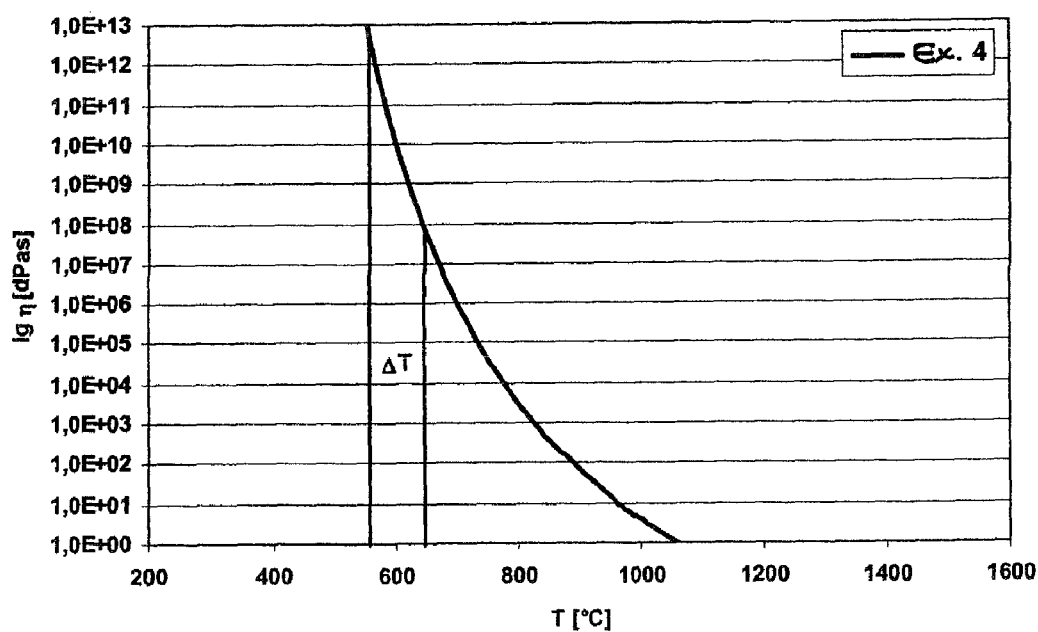

FIG. 2 shows the viscosity curve of a glass according to the present invention of example 4. The vertical lines show the temperature interval ΔT in which the viscosity of this glass decreases from $10^{7.6}$ to $10^{13}$ dPas. ΔT in this case is between 653 and 553° C., thus amounts to 100 K.

We claim:

1. Lead- and fluorine-free optical glass with a refractive index $n_d$ of $1.60 \leq n_d \leq 1.64$ and an Abbe number $v_d$ of $56 \leq v_d \leq 64$, wherein the glass comprises the following composition (in % by weight based on oxides):

| | |
|---|---|
| $P_2O_5$ | 26-35 |
| $B_2O_3$ | 10-15 |
| $Al_2O_3$ | 5.5-10 |
| BaO | 25-37 |
| SrO | 0-6 |
| CaO | 8-15 |
| ZnO | 5-10 |
| $Bi_2O_3$ | 0-8 |
| $Na_2O$ | 0-1.5 |
| $K_2O$ | 0-1.5 |
| $WO_3$ | 0-10 |
| $La_2O_3$ | 0-2 |
| $Nb_2O_5$ | 0-1 |
| $TiO_2$ | 0-<1 |
| Σ alkaline earth metal oxides | ≧41 |
| Σ alkali metal oxides | 0-1.5 |
| at least one fining agent | 0-0.5. |

2. Glass according to claim 1 comprising the following composition (in % by weight based on the oxides):

| | |
|---|---|
| $P_2O_5$ | 26-35 |
| $B_2O_3$ | 10-15 |
| $Al_2O_3$ | 5.5-10 |
| BaO | 27-35 |
| SrO | 0-6 |
| CaO | 8-14 |
| ZnO | 5-10 |
| $Bi_2O_3$ | 0-8 |
| $Na_2O$ | 0-1.5 |
| $K_2O$ | 0-1.5 |
| Σ alkaline earth metal oxides | ≧41 |
| Σ alkali metal oxides | 0-1.5 |
| at least one fining agent | 0-0.5. |

3. Glass according to claim 1 comprising the following composition (in % by weight based on the oxides):

| | |
|---|---|
| $P_2O_5$ | 27-34 |
| $B_2O_3$ | 11-14 |
| $Al_2O_3$ | 5.5-9 |
| BaO | 28-34 |
| SrO | 0-6 |
| CaO | 9-13 |
| ZnO | 5-9 |
| $Bi_2O_3$ | 0-7 |
| $Na_2O$ | 0-1.5 |
| $K_2O$ | 0-1.5 |
| Σ alkaline earth metal oxides | ≧41 |
| Σ alkali metal oxides | 0-1.5 |
| at least one fining agent | 0-0.5. |

4. Glass according to claim 1 comprising the following composition (in % by weight based on the oxides):

| | |
|---|---|
| $P_2O_5$ | 28-33 |
| $B_2O_3$ | 11.5-13 |
| $Al_2O_3$ | 5.5-8 |
| BaO | 29-33 |
| SrO | 0-5 |
| CaO | 10-12 |
| ZnO | 5-8 |
| $Bi_2O_3$ | 0-6 |
| $Na_2O$ | 0-1.5 |
| $K_2O$ | 0-1.5 |
| Σ alkaline earth metal oxides | ≧41 |
| Σ alkali metal oxides | 0-1.5 |
| at least one fining agent | 0-0.5. |

5. Glass according to claim 1 wherein said at least one fining agent comprises (in % by weight):

| | |
|---|---|
| $Sb_2O_3$ | 0-0.5 and/or |
| $As_2O_3$ | 0-0.5 and/or |
| SnO | 0-0.5 and/or |
| $SO_4^{2-}$ | 0-0.5. |

6. Glass according to claim 1 being free of $SiO_2$, $Li_2O$ and/or CdO.

7. Optical element comprising a glass according to claim 1.

8. A method for production of an optical element comprising the step of precise pressing a glass according to claim 1.

* * * * *